United States Patent
Spitz

(10) Patent No.: US 8,336,780 B1
(45) Date of Patent: Dec. 25, 2012

(54) WINDOWED HOUSING WITH ROTATABLE IMAGING DEVICE

(75) Inventor: Glenn S. Spitz, Boulder, CO (US)

(73) Assignee: Webscan, Inc., Longmont, CO (US)

( * ) Notice: Subject to any disclaimer, the term of this patent is extended or adjusted under 35 U.S.C. 154(b) by 103 days.

(21) Appl. No.: 12/815,438

(22) Filed: Jun. 15, 2010

(51) Int. Cl.
*G06K 7/10* (2006.01)

(52) U.S. Cl. .............. 235/470; 235/462.14; 235/462.23; 235/462.25; 235/462.32; 235/462.43

(58) Field of Classification Search ............. 235/462.08, 235/462.11, 462.14, 462.43, 462.23, 462.25, 235/462.32, 479; 250/271, 334, 338.4, 582
See application file for complete search history.

(56) References Cited

U.S. PATENT DOCUMENTS

| | | | |
|---|---|---|---|
| 5,105,070 A | 4/1992 | Wike, Jr. et al. | |
| 5,144,120 A | 9/1992 | Krichever et al. | |
| 5,151,581 A | 9/1992 | Krichever et al. | |
| 5,192,857 A * | 3/1993 | Detwiler | 235/462.39 |
| 6,244,510 B1 | 6/2001 | Ring et al. | |
| 6,575,368 B1 * | 6/2003 | Tamburrini et al. | 235/462.25 |
| 6,839,133 B2 | 1/2005 | Gehring | |
| 2004/0164155 A1* | 8/2004 | Iwaguchi et al. | 235/462.08 |

* cited by examiner

*Primary Examiner* — Michael G Lee
*Assistant Examiner* — Tabitha Chedekel
(74) *Attorney, Agent, or Firm* — Island Patent; F. Scott Tierno

(57) ABSTRACT

A verifier imaging unit structured with a movably mounted imaging device, housed within a housing of the imaging unit, such that the orientation of the imaging device may be altered so that the imaging device may be placed in one of a number of available and pre-established imaging orientations. Each available imaging orientation has an associated imaging window, and a support surface provided about or proximate to the imaging window. The imaging window and support surface enable the placing, distancing, and generally proper locating of a data carrying graphical symbol for subsequent imaging and data collection activities. This abstract is provided to comply with rules requiring abstracts, and is submitted with the intention that it will not be used to interpret or limit the scope and meaning of the claims.

19 Claims, 9 Drawing Sheets

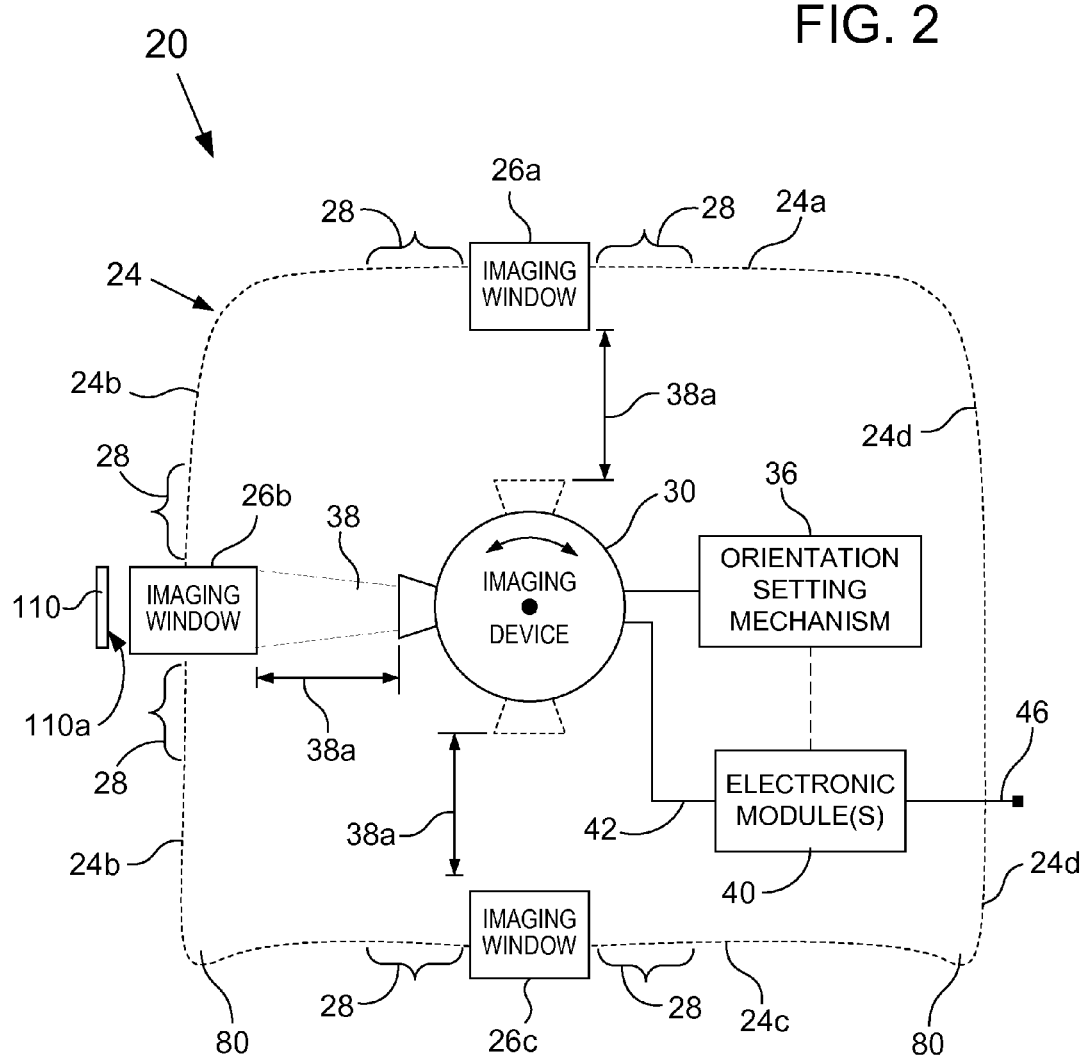

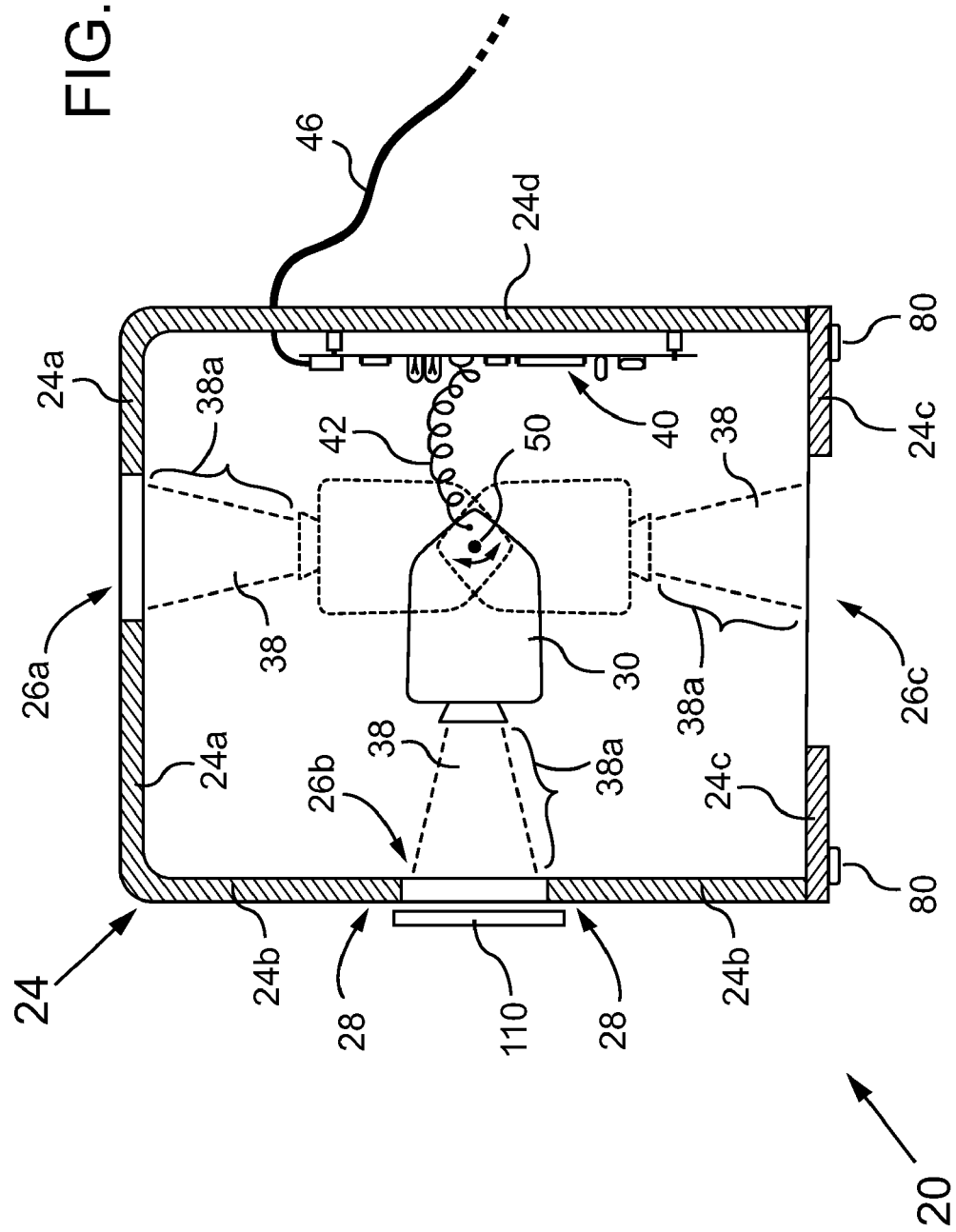

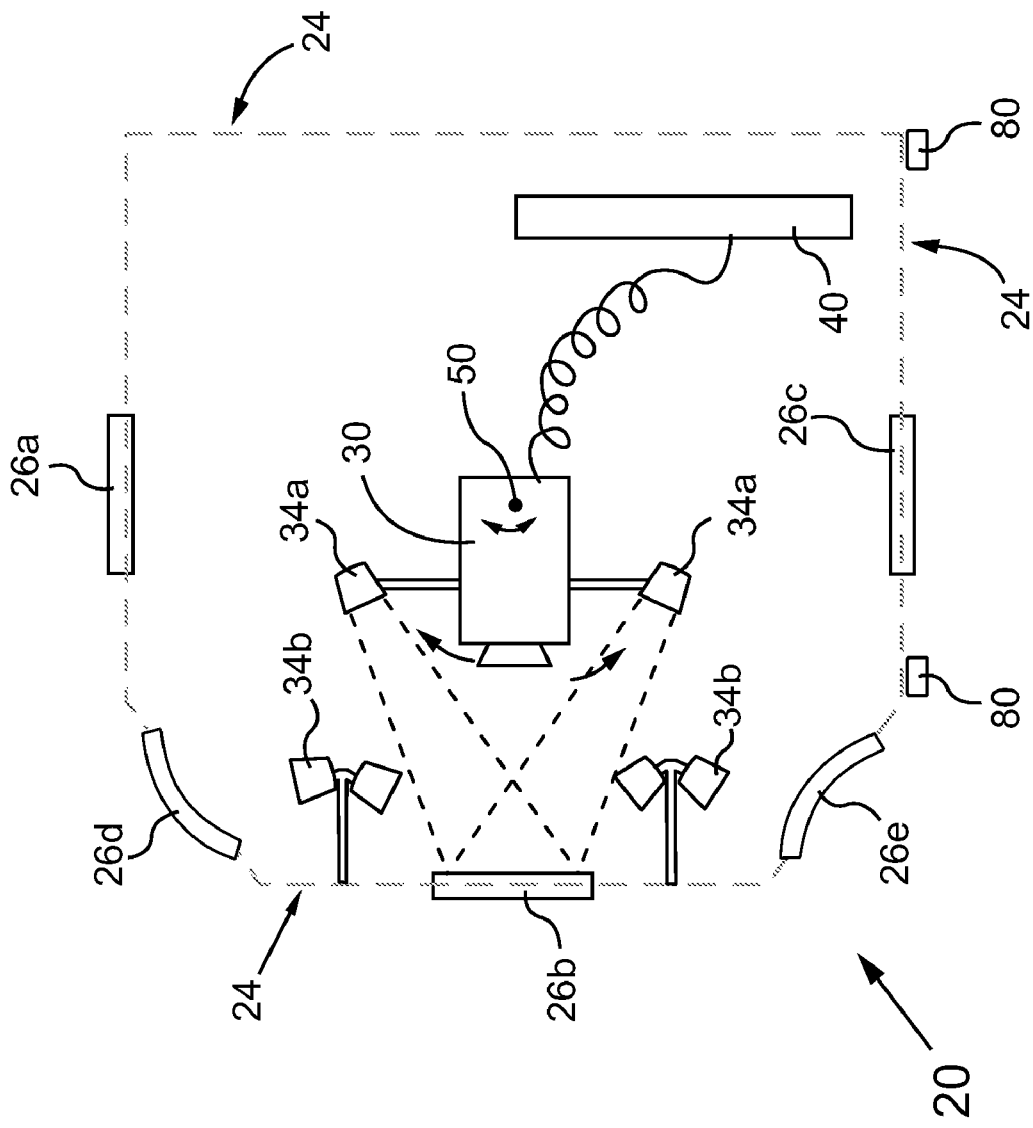

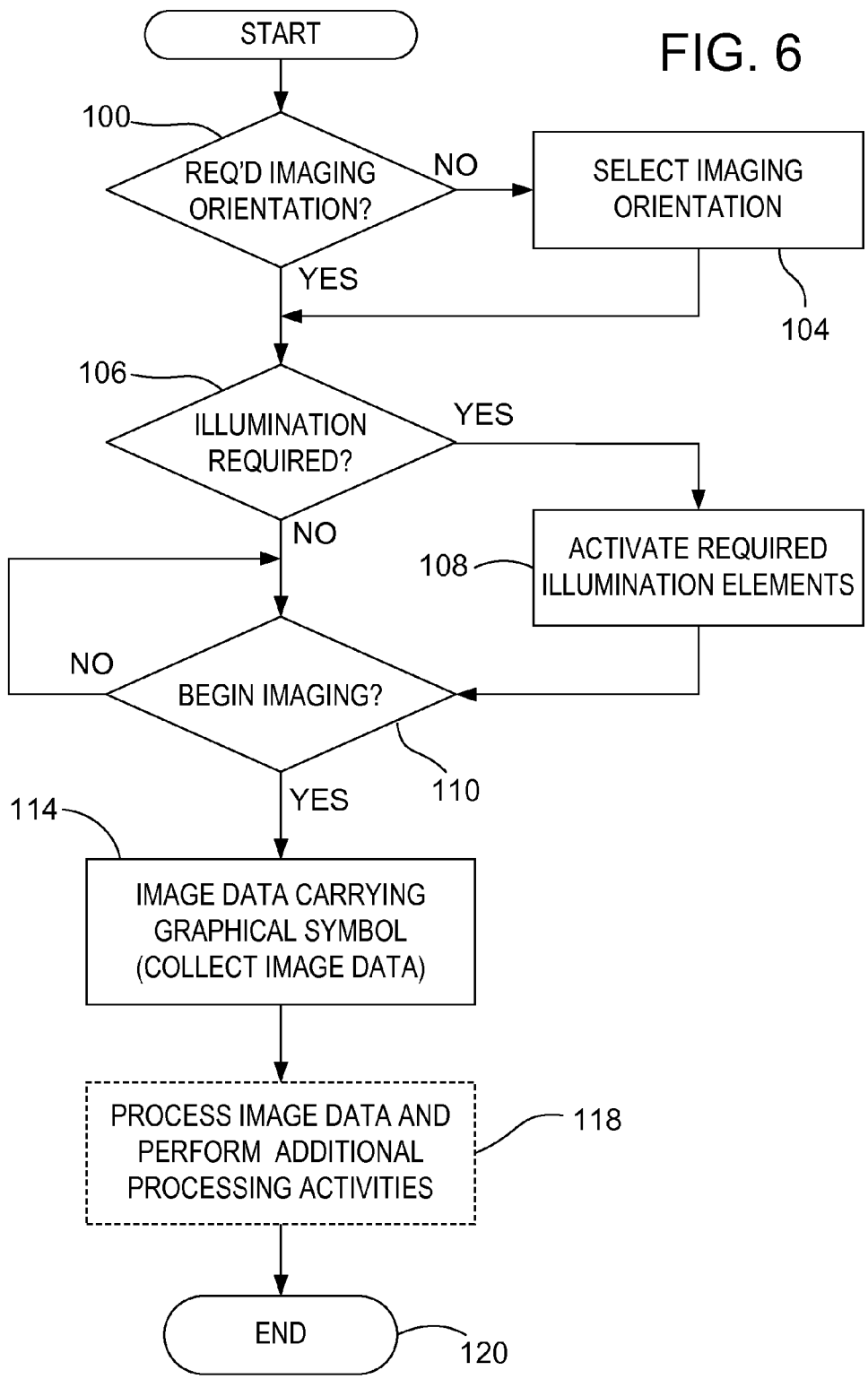

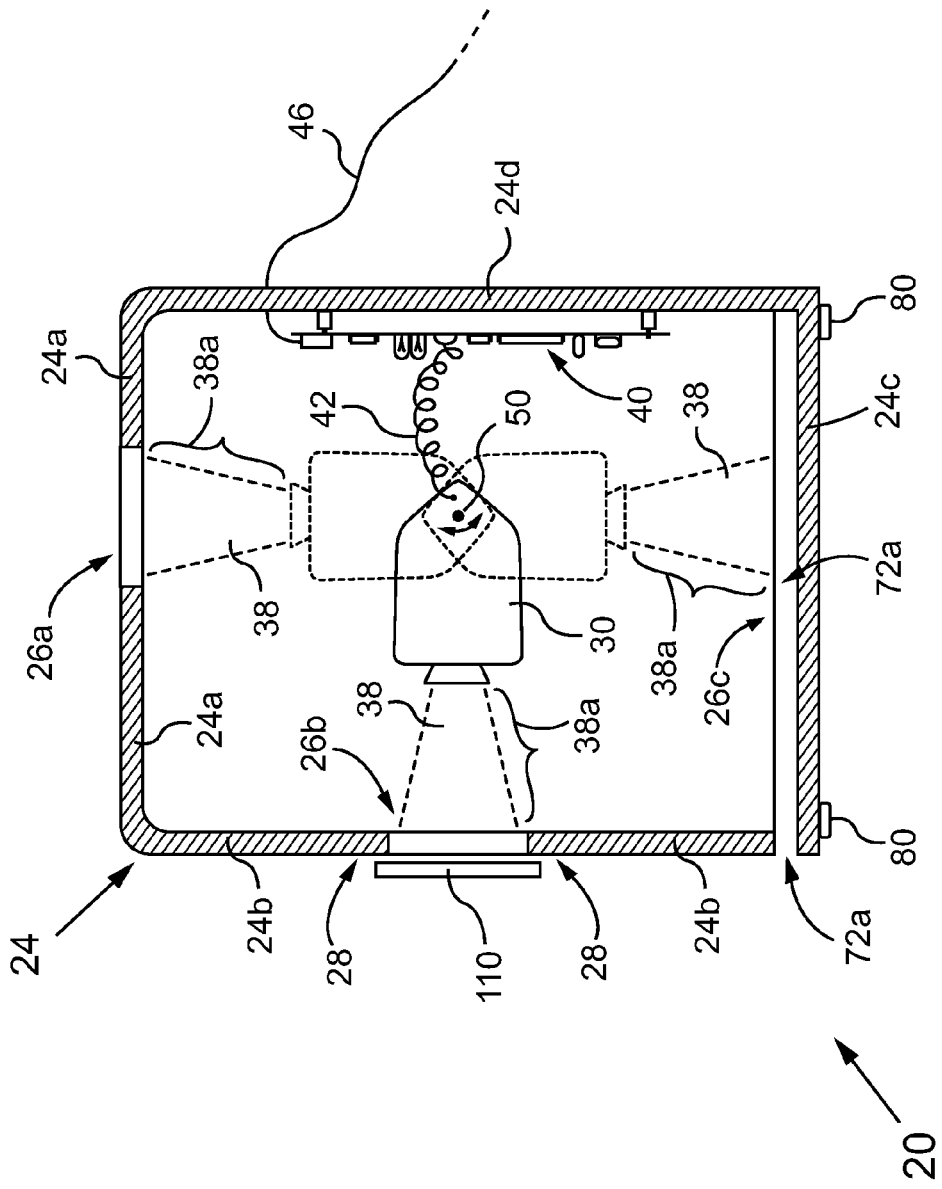

WINDOWED HOUSING WITH ROTATABLE IMAGING DEVICE

TECHNICAL FIELD

The presently disclosed invention relates most generally to imaging units employable with barcode verification and evaluation systems. More particularly, the present invention relates to an imaging apparatus and housing, or a portion thereof, having an adjustable imaging device, which can image a data carrying graphical symbol in any of a plurality of selectable imaging orientations. Imaging orientations may, at minimum, include upward, downward, and horizontal. Importantly, the imaging apparatus of the invention can properly and conveniently verify the print quality of a data carrying graphical symbol regardless of whether the symbol is printed on a 2-dimensional substrate, such as a sheet of stickers, or alternately printed (or placed) upon a 3-dimensional item, such as a vial or a container.

BACKGROUND

The need to test data carrying graphical symbols, including 1-dimensional and 2-dimensional barcode labels, during the manufacture of such product labels, is well understood. Typically, the data carrying graphical symbols may be tested both before being applied to an article or item of manufacture, as well as after. When testing data carrying graphical symbols that have been printed upon a sheet of stickers, an operator normally places one or more of the symbols upon a support surface, which places the label(s) at a pre-selected imaging distance, within the field-of-view (FOV) of an imaging device of the verifier apparatus. For example, as shown in FIG. 1A, a verifier apparatus 100 may be provided having a base portion 100a and an upper (imaging) portion 100b. As shown in FIG. 1A, a data carrying graphical symbol 110 may be placed upon a support table 100aa of the base portion 100a, for imaging purposes. This support table may be more generally termed a 'support surface'. As the data carrying graphical symbol 110 is flat, having a negligible thickness, the face of the symbol 110 is easily located at the proper imaging distance for high quality capture and verification. On the other hand, if the data carrying graphical symbol 110 of interest had been placed upon a vial or other 3-dimensional package, it would not be possible to readily place it upon the table 100aa of the base portion 100a—and still have the data carrying graphical symbol 110 properly spaced at the correct imaging distance from the imaging device of the verifier apparatus 100.

The prior art does teach 'remote imaging heads', such as imaging head 104 of FIG. 1B. The imaging head 104 represents an example of an imaging head that is coupled to a verifier base unit (not shown) by way of a communication cable 108. The imaging head 104 includes a base plate 104a and an upper housing portion 104b, which houses an imaging device. Importantly, the base plate 104a is structured with an open imaging window 106 that clearly establishes the field-of-view and the correct imaging distance for the imaging device (not shown) that is housed within the upper housing portion 104b. This arrangement significantly aides an operator of the imaging head 104 when needing to locate a data carrying graphical symbol 110 for imaging and verification purposes.

Accordingly, once the imaging head 104 has been placed upon an item so that the data carrying graphical symbol 110 can be imaged through the imaging window 106, verification imaging (capture) and related activities may commence. It may be noted that imaging heads 104, and equivalent capability structures, are helpful when the data carrying graphical symbol 110 to be imaged/scanned has already been applied (or printed upon) an item. For example, consider data carrying graphical symbols 110 that have been applied to pill bottles, containers, boxes, etc. These items often have a thickness that requires an imaging means with the capabilities of imaging head 104 to be employed. However, as understood by skilled persons, the imaging head 104 has to be lifted and placed upon the symbol of interest.

When a number of printed symbols must be verified, it is not convenient to have to lift, locate, and properly hold the imaging head 104 for subsequent image capture and verification activities. This situation is exacerbated when the symbol to be scanned has been placed or printed upon a small item—such as a rounded plastic vial or bottle. With such items, the operator often needs to hold both the imaging head 104 of FIG. 1B, as well as the item having the data carrying graphical symbol to be scanned. It may be noted that an alternate prior art approach—which is well understood by skilled persons—may employ a scanning means that supports fixed upward scanning. For example, known prior art verifiers exist wherein an item (and affixed data carrying graphical symbol) may be placed face-down upon, or waved across, a generally clear glass window, for detection and imaging by an imaging device fixed in position below the glass window. However, when considering larger and or heavy weight items, this arrangement and method may clearly not be convenient or efficient.

Accordingly, what is needed and presently taught is an imaging means that is capable of imaging a data carrying graphical symbol regardless of whether the symbol is affixed to or printed upon a label, a vial, a bottle, a package, etc. It would be most desirable to provide an imaging unit that may be quickly and readily configured by an operator to image data carrying graphical symbols through one of a plurality of selectable imaging openings that may be located on the top, side, or bottom of the imaging unit. A most preferred embodiment would enable an operator to immediately select and configure the imaging orientation of the imaging head so that imaging may occur upwardly, sideways/outwardly, or downwardly. It would also be helpful to assure that the same imaging distance is maintained for each of the available and operator selectable imaging orientations. A number of other characteristics, advantages, and or associated novel features of the present invention, will become clear from the description and figures provided herein. Attention is called to the fact, however, that the drawings are illustrative only. In particular, the embodiments included and described, have been chosen in order to best explain the principles, features, and characteristics of the invention, and its practical application, to thereby enable skilled persons to best utilize the invention and a wide variety of embodiments providable that are based on these principles, features, and characteristics. Accordingly, all equivalent variations possible are contemplated as being part of the invention, limited only by the scope of the appended claims.

SUMMARY OF PREFERRED EMBODIMENTS

In accordance with the present invention, an imaging unit is structured containing a movably mounted imaging device, preferably housed within an appropriate portable housing, wherein the imaging orientation of the imaging device may be altered, as required. The housing may be structured with a plurality of wall portions, with selected wall portions each including at least one imaging window and having an associated interior or exterior support surface located proximate to the imaging window. Each support surface associated with an imaging window is included to enable an operator to readily locate a data carrying graphical symbol—to be imaged—at a proper in-focus object imaging distance from the imaging device. Once located at the proper imaging distance, subsequent imaging and image data collection may be readily realized. It should be noted that "imaging windows" may actually be physically provided in a number of fashions. Importantly, the term "window" is to be broadly defined, and will clearly include any suitable arrangement providing an unobstructed view of the data carrying graphical symbol by the imaging device—while also causing or enabling a locating of the data carrying graphical symbol at the proper imaging distance. As such, the imaging window may be a simple opening or cutout provided in a substantially flattened wall structure or more generally an opening providing visual access to the associated support surface. As such, an "imaging window" may be accessed by using a provided slot or gap, as clearly depicted at the lower portions of FIGS. 3A and 7A. In addition, it may be noted that the gap or slot may actually be quite narrow (for example, ¼" to ½") or substantially larger (for example, say 1" to 4").

Importantly, in a possibly most preferred embodiment of the invention, the imaging device may be rotatably mounted within the housing such that it may be rotated about a fixed axis or axle, and into any of the plurality of available and pre-established imaging orientations. Further, by design, the imaging window and support surface of any selected imaging orientation is always maintained and located at the correct in-focus imaging distance, which is equivalently termed an "in-focus object distance". This is necessary when providing accurate and standardized verification and evaluation of data carrying graphical symbols in accordance with established and well known industry standards. It should further be noted that the term 'standardized evaluation and verification' may be assumed to indicate that the print quality of one or more data carrying graphical symbol is being analyzed and preferably graded using criteria or requirements established within printed standards defined by industry associations and or committees thereof. A number of print quality evaluation standards related to data carrying graphical symbols are certainly well known to those skilled in the art.

Another notable feature of the invention is the quick selecting of an imaging orientation for subsequent imaging and evaluation activities. For example, a most preferred and generalized embodiment may provide a basic mechanical arrangement wherein an operator may cause an axle, upon which an imaging device of the imaging unit is mounted, to rotate. If the imaging device is fixedly coupled to the axle, this would enable the rotating of the imaging device from a first imaging orientation into a second imaging orientation. In one preferred embodiment of the invention, an operator may select a required imaging orientation without a complicated procedure. For example, a simplest possible embodiment may provide an operator with a graspable knob (or equivalent functional structure) for causing a rotating of the imaging device into one of the available imaging orientations. Indeed, the position of the knob itself, may be used to indicate a presently selected imaging orientation and the associated imaging window and support surface to be utilized for imaging and verifying activities.

A plurality of preferred imaging orientations, would at minimum generally include upwardly, horizontally (or parallel to a surface upon which the housing of the imaging unit is placed), and downwardly. When considering the upward imaging orientation, a data carrying graphical symbol, such as a one-dimensional or two-dimensional barcode, would be placed face down upon a top of upper wall portion of the housing. For the horizontal imaging orientation, the graphical symbol may preferably be held up to an imaging window located on the side of the housing. For the downward imaging orientation, the imaging unit would most likely be placed down upon the data carrying graphical symbol, or alternately (as will be discussed hereinafter in greater detail) the graphical symbol may be slipped under the housing or most preferably inserted into a slot, gap, or space provided in a lower portion of the housing.

As understood by skilled individuals, the imaging unit of the invention may simply collect image related data for later download—for example to a desktop or notebook style computer. Such a computer may include software to download, store, process, and indicate print quality results. Alternately, the imaging unit of the invention may include electronic circuits and computational hardware for enabling the imaging, capturing/storing, and processing of data, wherein an operator may be provided with an immediate print quality indication.

BRIEF DESCRIPTION OF THE DRAWINGS

In the drawings, like elements are assigned like reference numerals. The drawings are not necessarily to scale, with the emphasis instead placed upon the principles and features of the present invention. Additionally, each of the embodiments depicted are but one of a number of possible arrangements utilizing the fundamental components and concepts of the present invention. The drawings are briefly described as follows:

FIG. 2 provides a high level and somewhat conceptual depiction of a most generalized embodiment of the present invention.

FIG. 3B provides a partial sectional side view, taken along the line 3B-3B of FIG. 3A.

FIG. 5 depicts a more generalized and possibly alternate embodiment in accordance with the present invention.

FIG. 6 provides a high level flowchart depicting preferred methods of the invention.

FIGS. 7A and 7B depict another possibly most preferred embodiment of an imaging unit of the present invention.

PARTIAL LIST OF REFERENCE NUMERALS

Figure 1A:
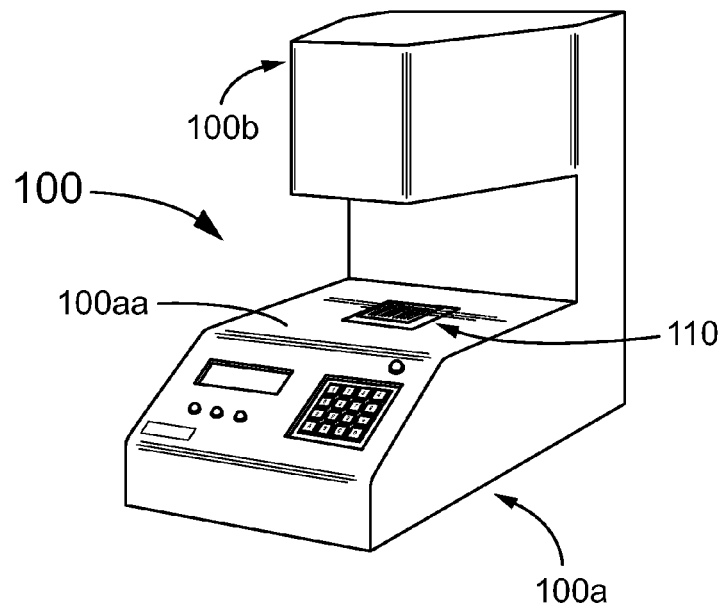
FIGS. 1A and 1B provide illustrations of two industry standard verifier units, which are well known in the art.
Figure 1B:
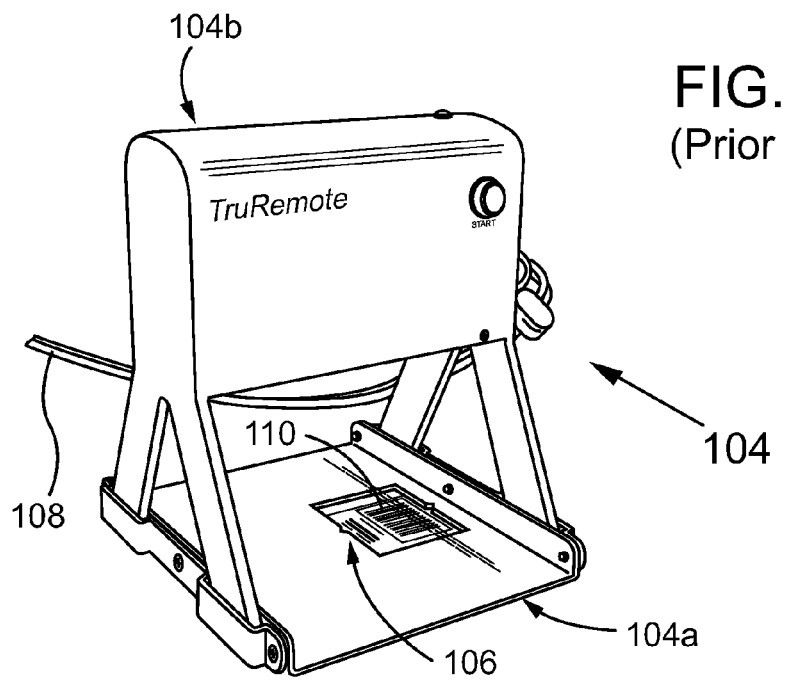

20—imaging unit
24—housing (of 20)
24a—top wall portion
24b—side wall portion
24c—bottom wall portion
24d—rear (back) wall portion
26a—top or first imaging window
26b—side or second imaging window
26c—bottom or third imaging window
28—support surface
30—(rotatably mounted) imaging device
34—illumination source
34a—imaging device mounted illumination source 34b—housing mounted illumination source
36—orientation setting mechanism
38—field-of-view (of 30)
38a—imaging distance or focal distance
40—electronics module
42—electrical coupling
44—pushbutton
46—cable
50—rotational axis (axle or shaft)
60—knob
62—imaging activation pushbutton
66a—first imaging orientation alignment mark
66b—second imaging orientation alignment mark
66a—third imaging orientation alignment mark
70—additional alignment window
72—side access gap
80—feet
100—verifier apparatus
100a—base portion (of 100)
100b—upper/imaging portion (of 100)
100aa—support table or support surface
104—imaging head
104a—base plate
104b—upper housing portion
106—imaging window (of 104a)
108—cable
110—data carrying graphical symbol

DETAILED DESCRIPTION OF EMBODIMENTS OF THE INVENTION

It is important to establish the definition of a number of descriptive terms and expressions that will be used throughout this disclosure. As will also be discussed and defined in the following sections and claims, the term 'imaging unit' is to be broadly defined and may include a variety of possible imaging devices. Importantly, each embodiment of the invention will include an imaging unit containing an imaging device, that may be adjusted such that it may image a data carrying graphical symbol in any of a plurality of available imaging orientations—regardless of the actual imaging device/element employed. Preferred imaging orientations may include substantially upwardly, substantially horizontally (in at least one direction), and substantially downwardly. Further, possible 'imaging devices' that are employable with embodiments of the imaging unit of the present invention are also to be broadly defined as well, and may certainly be based on laser scanning technology, charge coupled devices (CCDs), digital camera technology, and other possible imaging and capture arrangements.

When considering a selected imaging orientation, the manner in which an operator holds or places an object in position for imaging will vary accordingly. As such, with an upward imaging orientation, a data carrying graphical symbol must be placed face down upon an upper wall portion and or support surface of the housing at which an imaging (access) window is provided. For the horizontal imaging orientation(s), which may generally be substantially parallel to a surface upon which the housing of the imaging unit is sitting, the face of the data carrying graphical symbol may preferably be held up to a side imaging window formed in a side wall portion of the housing. For the downward imaging orientation, there are at least several arrangements that are possible. A first would call for the imaging unit to be lifted and placed down upon an upward facing data carrying graphical symbol. Another possibly preferred arrangement enables a piece of substrate upon which the data carrying graphical symbol is provided to be slipped into a slot, gap, or more generally a space or opening provided near or at the bottom of the imaging unit. This latter approach and associated structures removed the necessity for the operator to have to lift and locate the imaging unit for each data carrying graphical symbol imaging event.

Continuing, the term 'imaging window' may certainly to be understood to indicate an opening, cutout, or more generally any suitable void, possibly provided in a selected location of a wall structure of the housing of the imaging unit. However, an imaging window may also be formed by an opening established by a minimal or a spaced wall portion. Importantly, a broadly defined 'imaging window' is structured for enabling an operator to readily locate a data carrying graphical symbol such that the face of a data carrying graphical symbol is within the field-of-view of an imaging device and may subsequently be imaged. Further, it may be assumed that each imaging window is associated with a different and unique imaging orientation. Finally, is should be noted that each included imaging window has associated therewith a proximate interior or exterior surface (e.g., of a wall structure of the housing) that serves as what will be termed a 'support surface'. Once a data carrying graphical symbol has been placed upon a support surface, and within a selected imaging window, imaging activities may commence.

The expression 'data carrying graphical symbol' may be assumed to indicate any graphic, including ubiquitous one-dimensional and two-dimensional barcodes, that contains encoded and readable information. Accordingly, an equivalent to a data carrying graphical symbol will include any symbol containing information that can be machine read and decoded, and for which the print quality is important to such reading and decoding activities. The term 'object distance' is to be defined as the distance from the imaging device to the face of the data carrying graphical symbol to be imaged. To be more specific, the required object distance is substantially the distance from the imaging window and support surface (and a support plane thereof) of a selected imaging orientation, to an imaging plane of the imaging device. This distance must be maintained for each of the available imaging orientations for true and/or accurate in-focus imaging of the face of the graphical symbol. It may be noted that the term imaging distance may also be referred to as a 'focal distance' or an 'in-focus distance'. The term 'substantially' will be employed as a modifier to indicate either exactly or quite close to the given feature, structure, or characteristic. For example, the phrase 'substantially constant' may indicate that a distance is exactly fixed, or within +/−1 or 2 percent of a nominal and defined exact value. In like fashion, the term 'substantially flat' can be assumed to mean that a surface or member may be exactly flat/planar, or have a slight and insignificant curvature. Importantly, the terms 'couple', 'coupled to', 'coupling', and the like, are to be understood to mean that two or more described items or limitations are either directly connected together, or alternately, connected to each other via one or more additional, possibly implied or inherent structures or components. Other important terms and definitions will be provided, as they are needed, to properly define the present invention and its associated novel characteristics and features. In addition, the terms and expressions employed herein have been selected in an attempt to provide a full, complete, and accurate description of the invention. These terms may very well have equivalents known to skilled individuals, which may be long established in the art. As such, the terminology employed has been carefully chosen and is intended for illustration and completeness of description, and may very well have equivalents that are known in the art, but not employed here.

Referring now to the drawings, FIG. 2 provides a high level somewhat conceptual depiction of one generalized embodiment in accordance with the present invention. As shown, an imaging unit 20 is structured with an imaging device 30 housed within a housing 24. Importantly, the imaging device can be oriented in any of a plurality of available imaging orientations. For example, as shown in FIG. 2, a plurality of imaging windows, including imaging windows 26a, 26b, and 26c, are each associated with a unique and readily available imaging orientation. More specifically, and as clearly seen in FIG. 2, the plurality of imaging windows may include a first imaging window 26a (provided in a top wall portion 24a of the housing 24), a second imaging window 26b (provided in a side wall portion 24b), and a third imaging window 26c (provided on a bottom surface or wall portion 24c). As depicted, the bottom and third imaging window 26c may be of a differing size and or structure when compared to the top imaging window 26a and the side imaging window 26b.

Therefore, based on the above description, the housing 24 may preferably be structured such that a plurality of the included wall portions may each provide least one imaging window. Further, each imaging window has proximate thereto, an associated interior or exterior housing wall portion that may be termed a support surface 28. Generally, the support surface 28 will be an exterior wall portion or surface. However, when considering the downward imaging direction, the support surface may actually be an interior (facing) wall portion. Importantly, the support surfaces are employed to contact, support, and establish a required (in-focus) object distance 38a from the face of a data carrying graphical symbol to the imaging device employed for imaging of the data carrying graphical symbol.

Turning again to FIG. 2, clearly an important feature of the invention provides for a maintaining of a substantially constant object distance 38a, regardless of the actual imaging orientation that is selected. As shown, once the imaging device 30 is placed in a selected imaging orientation (horizontally or to the side as shown), imaging window 26b and a proximate support surface 28 thereabout, will be at a predetermined and required imaging object distance 38a within the field-of-view (FOV) 38 of the imaging device 30. That is, whether the imaging orientation set to an upward, horizontal (sideways), downward direction, the object distance 38a will not vary and will be maintained as a substantially constant distance. This is important in order to provide for an in-focus imaging of a face 110a of a data carrying graphical symbol 110 (FIG. 2). It well understood that a maintaining of a fixed/proper object distance when collecting imaging data is essential to providing accurate print quality evaluation and verification results.

In order to support a changing of the imaging orientation from a first selected imaging orientation to a second needed imaging orientation, the imaging unit 20 may include an orientation setting mechanism 36. As understood by skilled persons, such an orientation setting mechanism 36 may be realized as a simple manual arrangement, or alternately a possibly motorized arrangement. As such, the orientation setting mechanism 36 is to be broadly defined, with skilled persons able to provide a number of suitable structures (after a careful review of this disclosure).

Returning to FIG. 2, and also depicted in FIG. 3B, at least one electronics module 40 may be included and housed within the housing 24 of the imaging unit 20. At minimum, the electronics module 40 will aid in imaging activities and collecting image data, possibly for a later downloading and processing. Alternately, the collected image data may be immediately transmitted to a remote system, such as a near by desktop or laptop computer. Such a transmission may be realized by way of a wireless or optical communication channel, which are also well know to skilled individuals. Yet another possible embodiment of the imaging unit 20, and an incorporated electronics module 40, may support the collecting and local processing and analysis of the collected image data—preferably performed by included digital hardware of the electronics module 40. Accordingly, this latter and essentially self-contained embodiment may most preferably support a collecting and processing of image data, followed by a near immediate reporting of the print quality of the imaged data carrying graphical symbol. A possibly most preferred embodiment would be self-contained and internally powered by a rechargeable battery pack.

As appreciated by those skilled in the art print quality evaluation and verification of data carrying graphical symbols, whether local or remote processing is employed, a desired end result is an accurate and immediate reporting of determined print quality, possibly using a grading system of such as A through F.

Figure 3A:
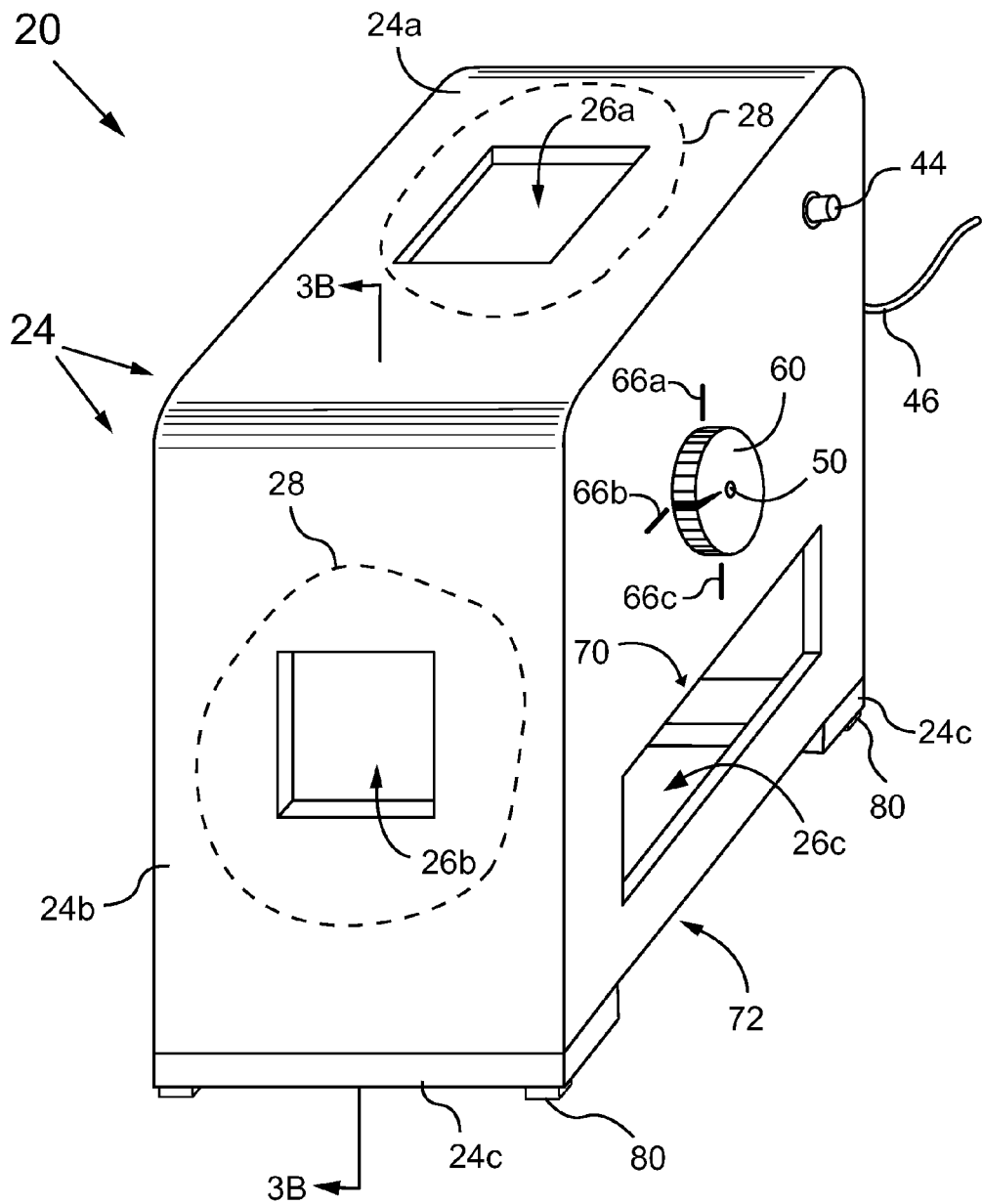
FIG. 3A depicts one possible embodiment of an imaging unit of the present invention.
Figure 4A:
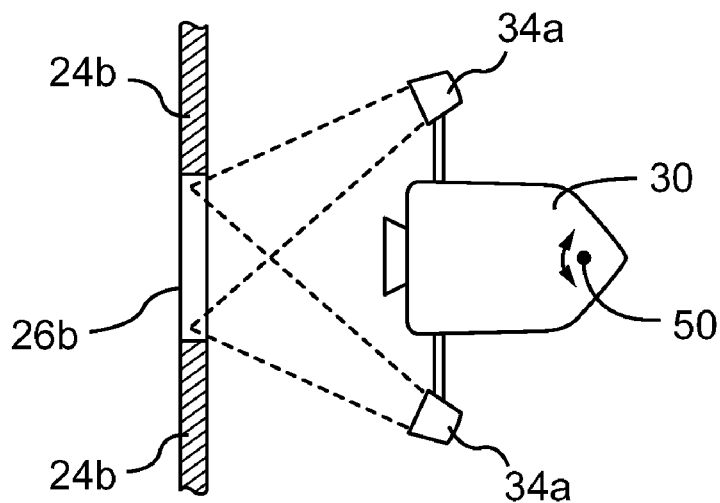
FIGS. 4A and 4B provide depictions, in accordance with the present invention, wherein illumination elements of the apparatus may be rotatably mounted (FIG. 4A) and fixedly mounted (FIG. 4B) within the housing of the imaging unit.
Figure 4B:
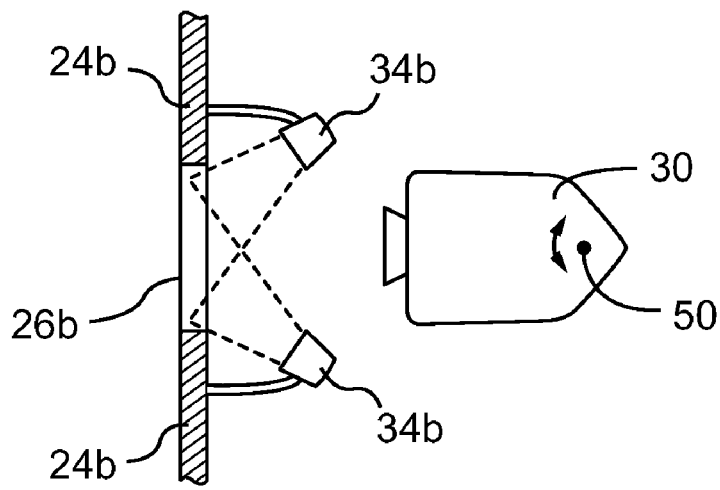

Turning now to FIGS. 3A and 3B, there is illustrated therein one possibly preferred embodiment of an imaging unit 20 of the present invention. Specifically, FIG. 3A provides a perspective view of the embodiment, which is structured with a rectangular shaped housing 24. FIG. 3B provides a partial sectional side view of an embodiment of the interior of the imaging unit 20, taken along the line 3B-3B of FIG. 3A. As shown, a plurality of imaging windows are provided, including imaging windows 26a (upward imaging), 26b (horizontal imaging), and 26c (downward imaging). As depicted in FIGS. 3A and 3B, the imaging window 26c may be of a different size and or construction than the imaging windows 26a and 26b. Clearly shown in FIG. 3A, on the right (exposed) side of the depicted imaging unit 20, is a user operable knob 60. The knob 60 may be coupled to a rotatable axle (best seen in the partial cutaway view of FIG. 3B), which is arranged for enabling a rotating of the imaging device 30. As understood by those in the mechanical arts, an axle 50 may therefore act as a rotational axis so as to rotatably support the imaging device 30. A rotatably supported imaging device 30 may then be rotated and maintained in a required imaging orientation. For example, as shown in FIG. 3B, the imaging device 30 may be positioned and fixed into a horizontal imaging orientation, in order to support imaging of a face of a data carrying graphical symbol 110 when the symbol is held up to and contacting the support surface 28 of the side imaging window 26b (as depicted). Alternately, as shown in dotted lines, the imaging device 30 may orienting in an upward imaging orientation or a downward imaging orientation. Basic retaining means may be provided by using a friction based approach, or well known detent-holding arrangements.

As further shown in FIG. 3B, at least one electrical coupling 42 may be employed for operatively (and electrically) coupling the imaging device 30 to the electronics module 40. The electrical coupling 42 employed may best be provided having a slack and or coiled portion of wire cable. Such a slack/coiled electrical coupling 42 would readily support the rotating of the imaging device 30 into any of the available imaging orientations. To support full 360 degree rotations, if needed, rotation electrical couplings (e.g., slip ring couplings) may be employed.

As additionally shown in FIG. 3A, when a knob 60 and axle 50 are employed for selecting a required imaging orientation, a plurality of imaging alignment marks may be included. For example, as illustrated in FIG. 3A, imaging orientation alignment marks 66a, 66b, and 66c may be provided to indicate an imaging orientation of upward, horizontal, and downward, respectively. This arrangement, along with the inclusion of an imaging activation pushbutton 44, may represent a minimal operator interface for the operation of the imaging unit 20. However, if the imaging unit 20 is provided as a more self-contained and preferably portable verifier unit, additional pushbuttons, switches, display means, and audio and visual annunciators may be provided, as needed to support the desired operation of the imaging unit 20. Such user interface devices and means are well understood by those skilled in the art.

Referring again to FIGS. 3A and 3B, a wall portion proximate to an imaging window may be provided as a substantially flat region of housing wall, which again may be termed a 'support surface'. The shown support surfaces 28 would provide a surface that an operator may employ to position a data carrying graphical symbol upon and within an associated and very proximate imaging window. This will insure that the face of the data carrying graphical symbol (which carries the encoded data) will be positioned at a constant and required object distance 38a, and within the FOV 38 of the imaging device 30 for enabling imaging and data collecting activities.

When considering the downward imaging orientation, there are a number of possible housing and support configurations that may be employed for providing imaging windows and associated support surfaces. For example, as possibly best seen in FIG. 3A, and further shown in FIG. 3B, one simple approach would be to provide a side access gap 72. The access gap 72 would enable a data carrying graphical symbol to be slid under the imaging unit 20 for subsequent imaging and capture activities. As shown, the gap 72 may be established by bottom wall portions 24c, as clearly depicted in FIGS. 3A and 3B. It should be noted that this arrangement may require the data carrying graphical symbol to be provided upon a narrow strip of substrate for accessing the access gap (without having to lift the imaging unit 20). Alternately, the user can certainly lift the imaging unit 20 and place it down upon a substrate portion that is too large to be slid into the access gap 72.

Figure 7A:
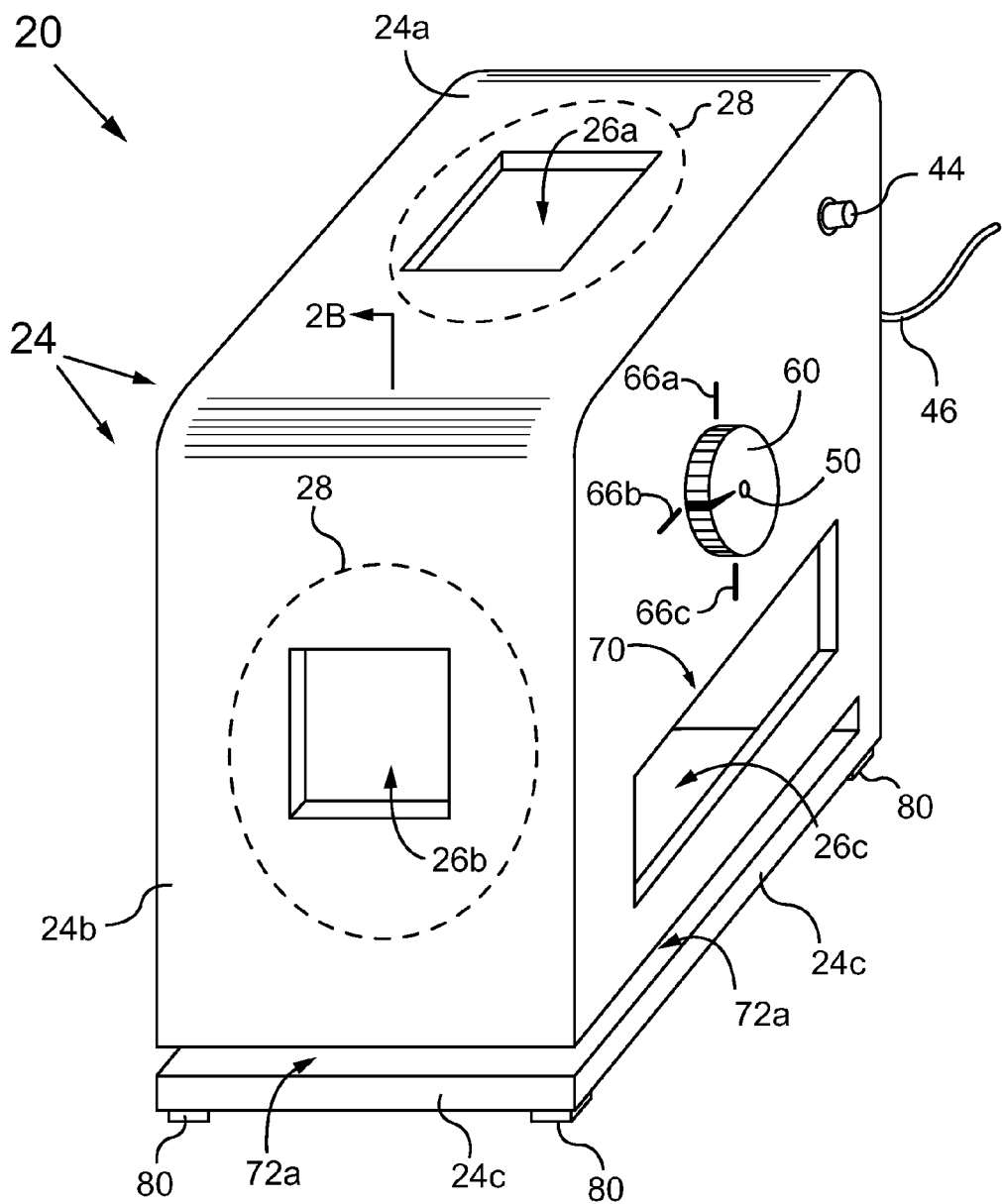

Another example of a housing 24 of an imaging unit 20, which possibly represents a preferred configuration, is illustrated in FIGS. 7A and 7B. As can be seen therein, a forwardly or front accessible access gap 72a is provided with a slightly modified housing 24. Most notably the back wall portion 24d and the bottom wall portion 24c have been modified to provide the front accessible access gap 72a. As shown, this preferred embodiment may provide a rear wall 24d and an orthogonally coupled bottom wall 24c—which may actually be most preferably be formed of a single piece of L-shaped material. Skilled persons may certainly modify the housings and structures depicted in FIGS. 3A, 3B, 7A, and 7C, to provide other functionally equivalent imaging units 20 that enable imaging in one of a plurality of imaging orientations. For example, the gaps 72/72a depicted in FIGS. 3A/3B and 7A/7B may arranged to be substantially larger (taller) than depicted. If a much wider gap or space is preferable (such as the gap/space provided by the embodiment such as that of FIG. 1A), the housing 24 and included wall structures thereof may be modified and most likely reduced. A larger gap may be helpful when an operator needs to place and hold a data carrying graphical symbol in position for downward imaging.

Returning again briefly to FIGS. 3A, 3B, 7A, and 7B, embodiments of the imaging unit 20 may further include a plurality of feet members 80. Feet members 80, as shown, may be coupled to the bottom or outer surface of wall portion 24c, and may be included as 'non-slip feet', for preventing an unwanted sliding of the housing 20 placed down upon a resting surface.

It is important to note that a most preferred embodiment of the imaging unit 20 would be portable and may be structured with any suitable bottom access gap 72/72a wherein an operator may readily place (e.g., slide or insert) a data carrying graphical symbol, such as a one or two dimensional printed barcode indicia, into a field-of-view of an imaging device 30 of the imaging unit 20. Once positioned in the FOV, the operator may image of the data carrying graphical symbol and possibly be provided with a substantially immediate indication of the print quality of the imaged symbol.

Returning again to FIGS. 3A and 3B, the astute individual will notice that the depicted imaging windows are provided within wall portions that are substantially flat. Having flat support surfaces proximate to and around an imaging window will enable an operator to readily support a flat surfaced item (and or substrate) having a data carrying graphical symbol thereupon in a proper position. However, as shown in the conceptual block diagram of FIG. 5, curved wall portions and or associated imaging windows may provide support surfaces and imaging windows that are curved. For example, as shown in FIG. 5, the imaging window 26d and proximate support surface 28 may be structured to be of a convex shape. Yet another imaging window 26e may be provided having a concave shape. Also clearly shown in FIG. 5 are imaging windows having imaging orientations in addition to the previously discussed substantially straight upward, substantially horizontal, or substantially straight downward. Further, although all imaging orientations are depicted in a single plane in FIGS. 2, 3B, and 5, imaging orientations and locations may certainly be provided in multiple planes, possibly requiring a more complicated orientation setting mechanism 36.

It also should be noted that in addition to fixed curved portions, other approaches may be utilized to enable irregularly and curved shaped items with data carrying graphical symbol provided thereupon to be properly supported. These support structures will enable the holding of a data carrying graphical symbol in a stable position when contacting the support surfaces 28 proximate to an imaging window. One possible alternative is to provide snap-in pieces and adaptors (not illustrated) that may be employed to provide the curvature, texture, or physical feature required. Further, when the snap-in pieces are removed, the support surface exposed may be arranged as a simple flat support surface.

Turning again to FIG. 5, the imaging unit 20 illustrated therein includes a plurality of illumination elements that are fully housed within the housing 20. As clearly shown, a first possible plurality of illumination elements 34a may be fixed to the rotatably mounted imaging device 30. As such, the illumination elements 34a are configured to rotate with the imaging device 30, and therefore provide illumination to any selected imaging windows when in a corresponding imaging orientation. In addition, or alternately, illumination elements may be fixed in position within the housing, and arranged for illuminating only a single selected imaging window of the plurality of available imaging windows. In a possibly preferred embodiment, both illumination elements 34a and 34b may be included. Further, a plurality of fixed and non-rotatable illumination elements 34b may be provided and arranged to be selectively energized to provide illumination that is of a selected wavelength (color), a selected intensity level, and or at a selected incident angle. Importantly, one or more of these parameters (wavelength, intensity, and incident angle) may be varied for each imaging window of the imaging unit 20. It should also be noted that the included fixed illumination elements 34b, associated with a selected imaging window, may only be energized when the imaging device is rotated into the imaging orientation associated with the imaging window. That is, for example, a micro-switch or enable output from a included microcontroller would only enable illumination elements 34*b* to be activated for a particular imaging orientation when the imaging device 30 is positioned in that imaging orientation.

Referring now to the flowchart of FIG. 6, several possible methods of the invention will be discussed. As shown, the method may commence at 100 with a check of the current imaging orientation. If the imaging orientation at 100 is the required imaging orientation, there would be no need for re-orienting of the imaging device, and the method proceeds to step 106. If the current imaging orientation is not the required orientation, at step 104 an orienting of the imaging device is effected, resulting in a selecting of an imaging orientation and associated imaging window (and support surface) for subsequent imaging activities. For example, in a possibly most preferred embodiment of the invention, at step 104 the setting of the desired imaging orientation may simply involve an operator grasping and rotating the knob 60 (as shown in FIGS. 3A and 7A) causing the imaging device 30 within the housing of the imaging unit 20 to be manually oriented into the required imaging orientation.

Regardless of the approach and mechanical orientation structure 36 used to set the imaging orientation, once the imaging orientation is established, a selecting and or activation of any required illumination elements may be carried out. For example, at step 106 if an altering of the present illumination settings and or elements is needed, step 108 would be employed resulting in an activating of only the required illumination elements.

At step 110, a loop may be included to determine when the imaging activities, and possible post processing of collected image data, may commence. This step may include the locating of the data carrying graphical symbol within the imaging window that is associated with the currently selected imaging orientation. Once the data carrying graphical symbol is properly positioned imaging and other activities may commence at step 114. For example, as shown and discussed when referring to FIG. 3A, if an imaging activation pushbutton 44 is included, an operator may be required to press the pushbutton 44 to start the imaging of the properly positioned data carrying graphical symbol. Alternately, the method may provide for an automatic (e.g., microcontroller based) controlling of the start of imaging activities. For example, a detecting of the presence of the properly positioned data carrying graphical symbol may by itself cause the needed imaging activities to commence. This latter approach, may include having the imaging device configured to periodically image the imaging window in order to detect if a data carrying graphical symbol is present. Those skilled in the art would understand the varied automatic methods that may be employed, and the optical and or mechanical detection means that may utilized.

Once a determination is made that imaging is to commence, at step 114 imaging of the data carrying graphical symbol results in the collecting of image data of the data carrying graphical symbol. At step 118, a possible processing of the collected image data may commence. As discussed hereinabove, the processing of the collected image data may be realized in a number of possible ways. For example, the processing may simply involve a storing of collected image data for later download to a preferably nearly local computing means such as a desktop or portable computer. In this case, once the image data is downloaded, a further processing of the image data may be conducted to report a print quality result. Alternately, the imaging unit itself may be employed for data processing and reporting of the print quality results. As such, the steps at 114 and 118 are to be broadly defined and may involve immediate or later processing of the image data collected, with the end goal being a verifying and reporting of the print quality of the imaged data carrying graphical symbol.

While there have been described herein a plurality of the currently preferred embodiments of the means and methods of the present invention, those skilled in the art will recognize that other and further modifications may be made without departing from the invention. For example, the method of FIG. 6 may certainly be altered in a number of ways. Consider the including of a detection means (either optical or mechanical) to determined when a data carrying graphical symbol is present within any available imaging window. Once the graphical symbol is detected in a respective imaging window, a subsequent altering of the imaging orientation, and or the activating of illumination elements, may be followed by included imaging and processing steps—possibly without further operator input. As such, the foregoing descriptions of the specific embodiments of the present invention have been provided for the purposes of illustration, description, and enablement. They are not intended to be exhaustive or to limit the invention to the specific forms disclosed and or illustrated. Obviously numerous modifications and alterations are possible in light of the above teachings, and it is fully intended to claim all modifications and variations that fall within the scope of the appended claims provided hereinafter.

What is claimed is:

1. An imaging unit structured with a housing containing a rotatably mounted imaging device that can be oriented in any of a plurality of available imaging orientations, the imaging unit comprising:
   a) a housing;
   b) the housing structured with a plurality of wall portions, with selected wall portions each including at least one imaging window and an associated and proximate support surface located about each imaging window;
   c) the imaging device, mounted within the housing such that the imaging orientation of the imaging device can be set to one of a plurality of available and pre-established imaging orientations, wherein a support surface and imaging window associated with the selected imaging orientation aids an operator in positioning and locating a data carrying graphical symbol to be imaged and evaluated;
   d) additionally, each support surface of each imaging window is structured such that when the imaging device is rotated and placed in the imaging orientation that is required, an object distance from the imaging device to the selected support surface is substantially constant regardless of which imaging orientation is employed, thereby insuring that a data carrying graphical symbol placed upon and in contact with the support surface associated with the selected imaging orientation and imaging window, will be located at an in-focus imaging distance for proper imaging;
   e) with the imaging unit capable of imaging and supporting print quality verification of a data carrying graphical symbol in any of the selectable imaging orientations.

2. The imaging unit in accordance with claim 1, wherein the associated support surface of an imaging orientation is one of:
   a) substantially flat; and
   b) substantially curved.

3. The imaging unit in accordance with claim 1, wherein an imaging device mounting arrangement, including an orientation setting mechanism fixed within the housing, is structured for enabling a rotating of the imaging device about a rotational axis, such that the imaging device can be placed and maintained in any of the plurality of available imaging orientations, including
  i) upwardly;
  ii) horizontally, in at least one direction; and
  iii) and downwardly.

4. The imaging unit in accordance with claim 3, wherein the rotatably mounted imaging device rotates upon an axle having a knob fixed to at least one end thereof, with the knob structured for grasping by an operator in order to rotate the imaging device from a first imaging orientation into a second imaging orientation of a plurality of available imaging orientations.

5. The imaging unit in accordance with claim 1, wherein a plurality of illumination elements are housed within the housing and structured for providing illumination of a data carrying graphical symbol, placed upon a support surface and within a corresponding and selected imaging window, during imaging and evaluation activities.

6. The imaging unit in accordance with claim 5, wherein illumination elements provided within the housing are at least one of:
  a) coupled to the rotatably mounted imaging device, such that the illumination elements rotate with the imaging device and can therefore provide illumination to any selected imaging window when in a corresponding imaging orientation; and
  b) fixed in position within the housing and arranged for illuminating only a single imaging window of the plurality of available imaging windows.

7. The imaging unit in accordance with claim 6, wherein a plurality of fixed illumination elements are provided for each imaging window, and can be selectively energized to provide illumination:
  a) of a selected wavelength; and
  b) at a selected incident angle.

8. The imaging unit in accordance with claim 7, wherein the housing is substantially rectangular and structured with a plurality of substantially rectangular imaging windows.

9. The imaging unit in accordance with claim 7, wherein an electronics module housed within the imaging unit housing enables at least one of the following activities and results to be realized:
  a) collecting image data of at least one data carrying graphical symbol for later download and processing;
  b) collecting and transmitting image data of an imaged data carrying graphical symbol to a remote computing system; and
  c) collecting and processing image data resulting from the imaging of a data carrying graphical symbol for determining and reporting the print quality of the imaged data carrying graphical symbol.

10. An imaging unit structured with a housing containing an internally and rotatably mounted imaging device that can be oriented and maintained in any of a plurality of available imaging orientations, with the imaging unit comprising:
  a) the housing having a plurality of imaging windows, wherein each imaging window and an associated and proximate support surface establishes a unique imaging orientation;
  b) the imaging device, internally mounted within the housing, such that the imaging device is rotatable about an axle within the housing such that an operator can manually rotate the imaging device into one of a plurality of available imaging orientations, by effecting a rotating of the axle upon which the imaging device is mounted;
  c) with the housing further structured to substantially maintain the support surface associated with each imaging window at a common and required in-focus object distance from the imaging device, such that when a data carrying graphical symbol is placed upon the support surface and within an associated imaging window, the graphical symbol is located within the field-of-view of the imaging device, and at the required in-focus object distance for subsequent imaging and data collection activities.

11. The imaging unit in accordance with claim 10, wherein each available imaging window is associated with a unique imaging orientation, including at minimum:
  a) an upward imaging orientation;
  b) a horizontal imaging orientation; and
  c) a downward imaging orientation.

12. The imaging unit in accordance with claim 10, wherein a plurality of illumination elements are housed within the housing and arranged for illuminating a data carrying graphical symbol when placed upon a support surface and within an imaging window of the imaging unit.

13. The imaging unit in accordance with claim 12, wherein illumination elements provided within the housing are at least one of:
  a) coupled to the rotatably mounted imaging device, such that the same illumination elements are rotated with the imaging device and can therefore provide illumination to any selected imaging window; and
  b) fixed in position within the housing and arranged such that each illumination element is arranged for illuminating only one of the imaging windows, with at least one illumination element available for illuminating each selectable imaging window.

14. The imaging unit in accordance with claim 13, wherein the included fixed and non-rotatable illumination elements that are associated with a selected imaging window, may only be energized when the imaging device is rotated into the imaging orientation associated with that imaging window.

15. A method of using a verifier imaging unit to image and evaluate the print quality of a data carrying graphical symbol, wherein the imaging unit includes a rotatably mounted imaging device, housed within a housing of the verifier imaging unit, that may be oriented into any one of a plurality of available imaging orientations, the method of using the imaging unit comprising the steps of:
  a) placing rotating the imaging device into one of the plurality of available imaging orientations, if not already in that imaging orientation, with the selected imaging orientation having associated therewith a selected imaging window and an associated support surface;
  b) locating a data carrying graphical symbol within the imaging window, and upon the support surface associated with the imaging window, for a subsequent imaging of a face of the data carrying graphical symbol;
  c) imaging and collecting image data of the data carrying graphical symbol, while being supported by the support surface at a preselected and fixed object distance.

16. The method as recited in claim 15, further including the step of illuminating the face of the data carrying graphical symbol prior to the imaging and collecting of the image data of the data carrying graphical symbol.

17. The method as recited in claim 16, further including an additional step of processing image data collected from the imaging of the data carrying graphical symbol, in order to evaluate and verify the print quality of the imaged data carrying graphical symbol.

18. The method as recited in claim 15, wherein the step of locating a data carrying graphical symbol within the selected imaging window involves one of:
  a) holding the data carrying graphical symbol up to the side of a housing of the imaging unit when a horizontal imaging orientation is selected;
  b) placing the data carrying graphical symbol face down upon a top surface of the housing of the imaging unit when an upward imaging orientation is selected; and
  c) placing the data carrying graphical symbol face up, when a downward imaging orientation is selected, such that the data carrying graphical symbol is one of:
     i) under the imaging unit; or
     ii) within an access gap, established by a gap between included wall portions, proximate to a lower portion of the housing, and a bottom wall portion.

19. The method as recited in claim 18, wherein the step of rotating the imaging device into one of the plurality of available imaging orientations involves an operator grasping and rotating a knob of the imaging unit.

* * * * *